United States Patent
Cho et al.

(10) Patent No.: US 12,108,803 B2
(45) Date of Patent: Oct. 8, 2024

(54) METHOD FOR COUNTING THE NUMBER OF PUFFS AND AEROSOL GENERATING DEVICE USING THE SAME

(71) Applicant: KT&G CORPORATION, Daejeon (KR)

(72) Inventors: Byung Sung Cho, Gwangmyeong-si (KR); Won Kyeong Lee, Guri-si (KR); Jong Sub Lee, Seongnam-si (KR); Dae Nam Han, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 1079 days.

(21) Appl. No.: 16/970,814

(22) PCT Filed: Apr. 14, 2020

(86) PCT No.: PCT/KR2020/005017
§ 371 (c)(1),
(2) Date: Aug. 18, 2020

(87) PCT Pub. No.: WO2020/213916
PCT Pub. Date: Oct. 22, 2020

(65) Prior Publication Data
US 2023/0109861 A1  Apr. 13, 2023

(30) Foreign Application Priority Data
Apr. 18, 2019  (KR) .................. 10-2019-0045646

(51) Int. Cl.
*A24F 40/53*  (2020.01)
*A24F 40/10*  (2020.01)
(Continued)

(52) U.S. Cl.
CPC .............. *A24F 40/53* (2020.01); *A24F 40/10* (2020.01); *A24F 40/42* (2020.01); *A24F 40/465* (2020.01);
(Continued)

(58) Field of Classification Search
CPC .......... A24F 40/53; A24F 40/10; A24F 40/42; A24F 40/465; A24F 40/50; A24F 40/51;
(Continued)

(56) References Cited

U.S. PATENT DOCUMENTS

| 5,261,424 A | 11/1993 | Sprinkel, Jr. |
| 9,532,600 B2 | 1/2017 | Thorens et al. |

(Continued)

FOREIGN PATENT DOCUMENTS

| CN | 103237468 A | 8/2013 |
| CN | 105611847 A | 5/2016 |

(Continued)

OTHER PUBLICATIONS

Extended European Search Report dated Aug. 13, 2021 from the European Patent Office in EP Application No. 20747334.9.
(Continued)

*Primary Examiner* — Justin M Kratt
(74) *Attorney, Agent, or Firm* — Sughrue Mion, PLLC

(57) ABSTRACT

A method of counting the number of puffs using an aerosol generating device is disclosed. The may include obtaining a first start time which is a time when a pressure measured by a sensor included in the aerosol generating device decreases below a first reference pressure value; obtaining a first end time which is a time when the pressure measured by the sensor reaches the first reference pressure value after the first start time; determining whether a first period, which is a period between the first end time and the first start time, is longer than or equal to a first reference period; and increase the number of puffs by one based on the first period being longer than or equal to the first reference period.

8 Claims, 9 Drawing Sheets

(51) Int. Cl.
  *A24F 40/42* (2020.01)
  *A24F 40/465* (2020.01)
  *A24F 40/50* (2020.01)
  *A24F 40/51* (2020.01)
  *G01L 23/08* (2006.01)
  *A24F 40/40* (2020.01)
  *A24F 40/60* (2020.01)
  *G01L 23/00* (2006.01)

(52) U.S. Cl.
  CPC .............. *A24F 40/50* (2020.01); *A24F 40/51* (2020.01); *G01L 23/08* (2013.01); *A24F 40/40* (2020.01); *A24F 40/60* (2020.01); *G01L 23/00* (2013.01)

(58) Field of Classification Search
  CPC .......... A24F 40/40; A24F 40/60; G01L 23/08; G01L 23/00
  See application file for complete search history.

(56) References Cited

U.S. PATENT DOCUMENTS

| | | | |
|---|---|---|---|
| 10,021,914 B2 | 7/2018 | Liu | |
| 10,130,780 B2 | 11/2018 | Talon | |
| 10,757,976 B2 | 9/2020 | Mironov et al. | |
| 2004/0030508 A1 | 2/2004 | Likness et al. | |
| 2006/0130860 A1* | 6/2006 | Cholet | A24F 13/12 131/330 |
| 2013/0340750 A1 | 12/2013 | Thorens et al. | |
| 2016/0206003 A1 | 7/2016 | Yamada et al. | |
| 2018/0146710 A1* | 5/2018 | Bessant | A24F 40/40 |
| 2020/0154773 A1 | 5/2020 | Lim et al. | |
| 2022/0061396 A1* | 3/2022 | Lord | G06F 1/3296 |

FOREIGN PATENT DOCUMENTS

| | | |
|---|---|---|
| CN | 108463128 A | 8/2018 |
| CN | 109349690 A | 2/2019 |
| EP | 3387923 A1 | 10/2018 |
| JP | 2013-545474 A | 12/2013 |
| JP | 3216735 U | 6/2018 |
| KR | 10-2017-0086107 A | 7/2017 |
| KR | 10-1792905 B1 | 11/2017 |
| KR | 10-1888281 B1 | 8/2018 |
| KR | 10-1922737 B1 | 11/2018 |
| WO | 2014/150942 A2 | 9/2014 |
| WO | 2015/052513 A2 | 4/2015 |
| WO | 2017/191143 A1 | 11/2017 |
| WO | 2018/099663 A1 | 6/2018 |
| WO | 2018/149117 A1 | 8/2018 |
| WO | 2018/190586 A2 | 10/2018 |

OTHER PUBLICATIONS

Notice of Reasons for Refusal dated Aug. 31, 2021 from the Japanese Patent Office in JP Application No. 2020-540316.
Office Action dated Feb. 10, 2023 from the Chinese Patent Office in Application No. 202080001225.2.
Office Action issued Sep. 22, 2020 in Korean Application No. 10-2019-0045646.
International Search Report issued Oct. 7, 2020 in International Application No. PCT/KR2020/005017.
Chinese Office Action dated Oct. 26, 2023 in Application No. 202080001225.2.

* cited by examiner

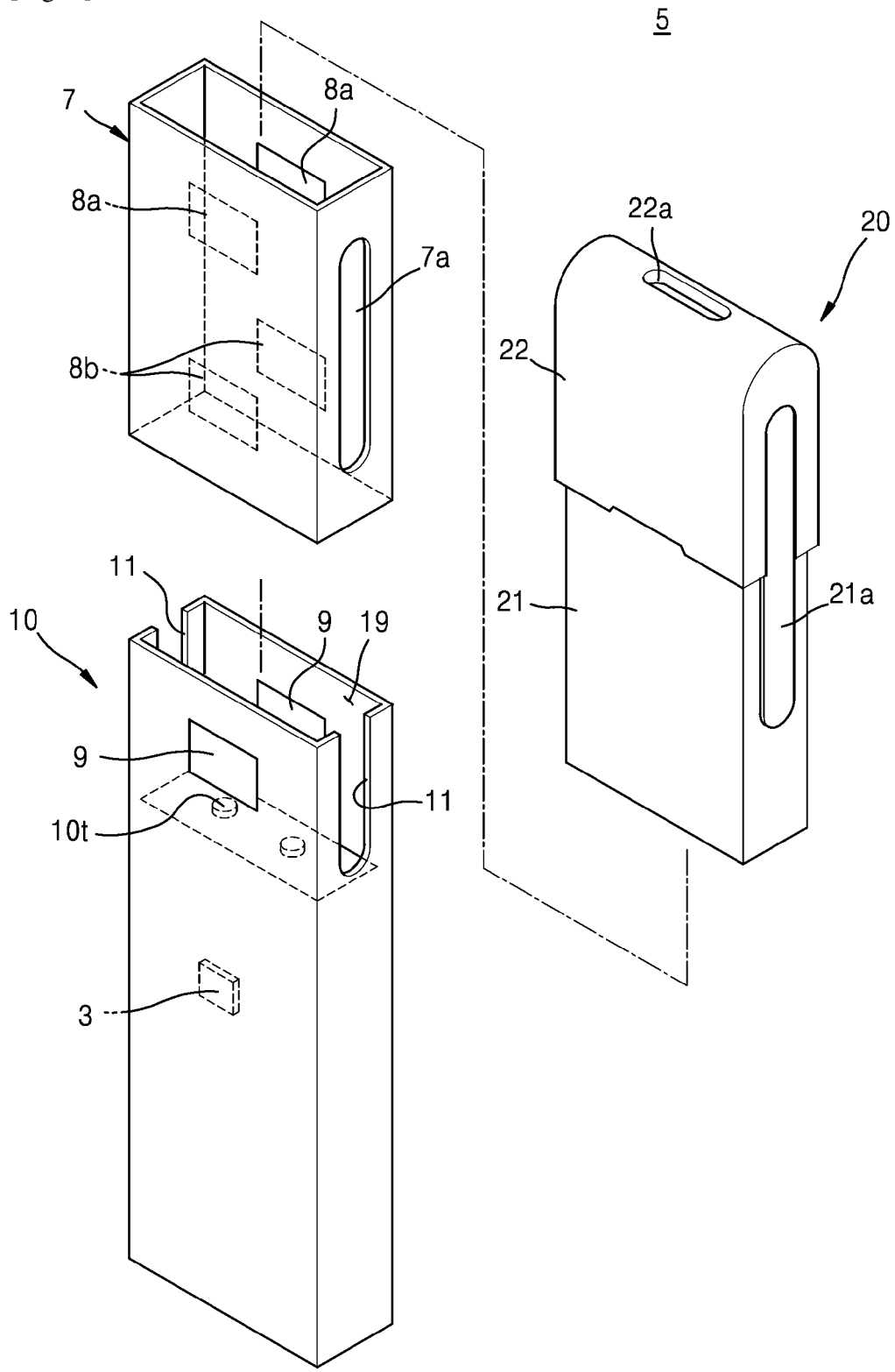
[Fig. 1]

[Fig. 2]
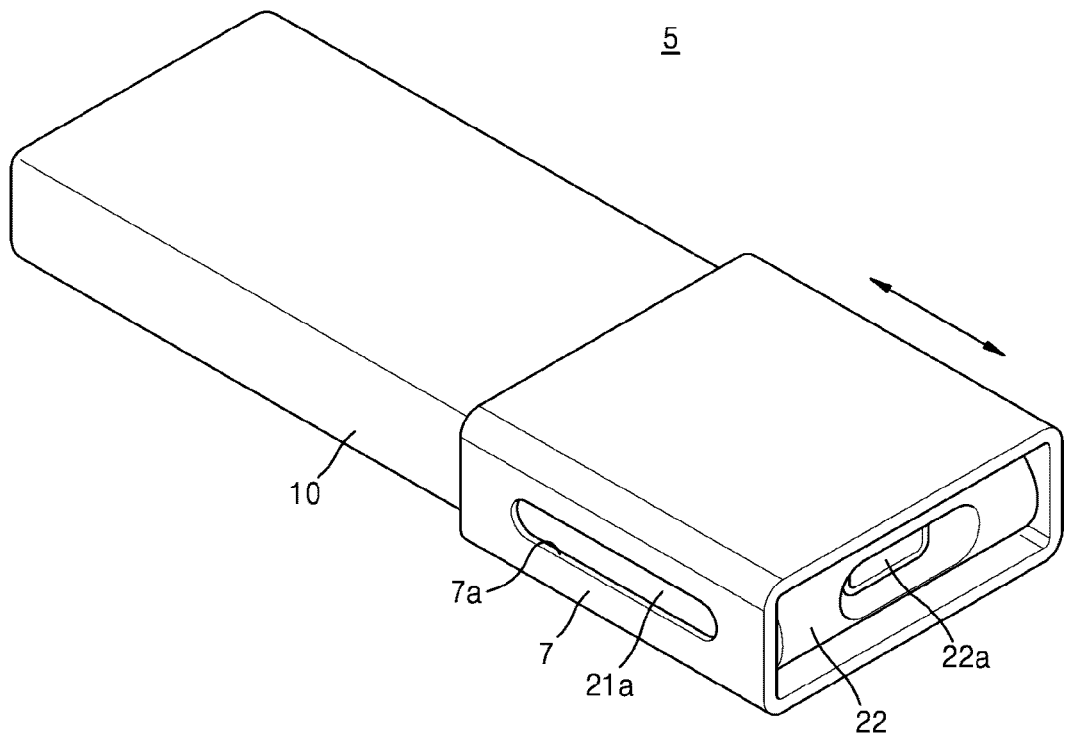
[Fig. 3]
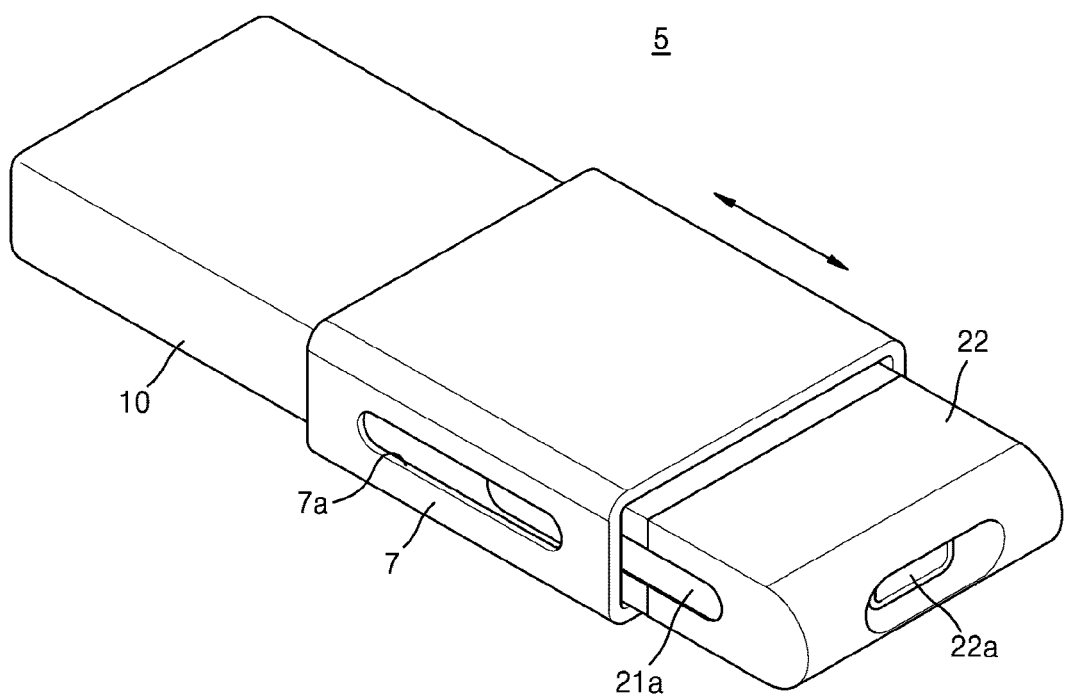

[Fig. 4]
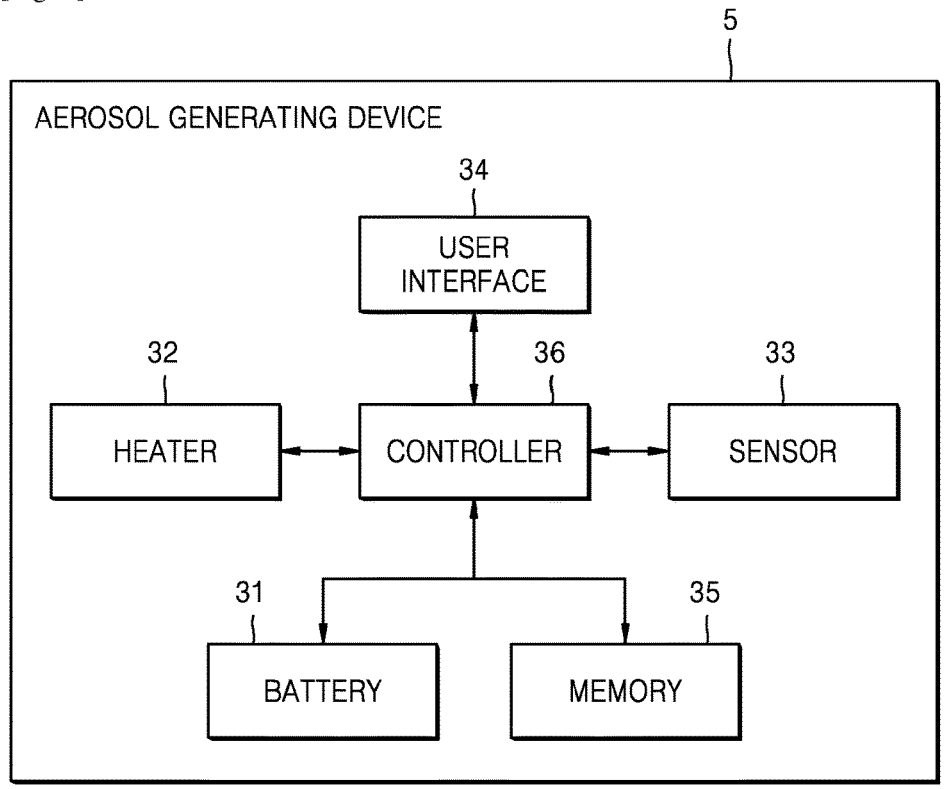
[Fig. 5]
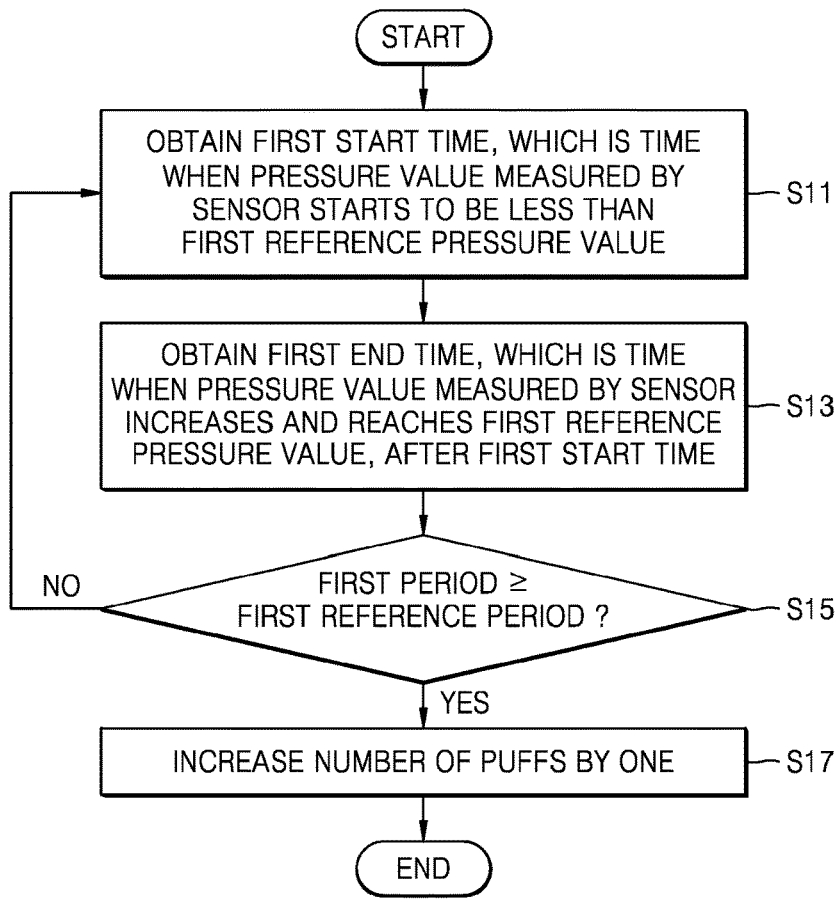

[Fig. 6]
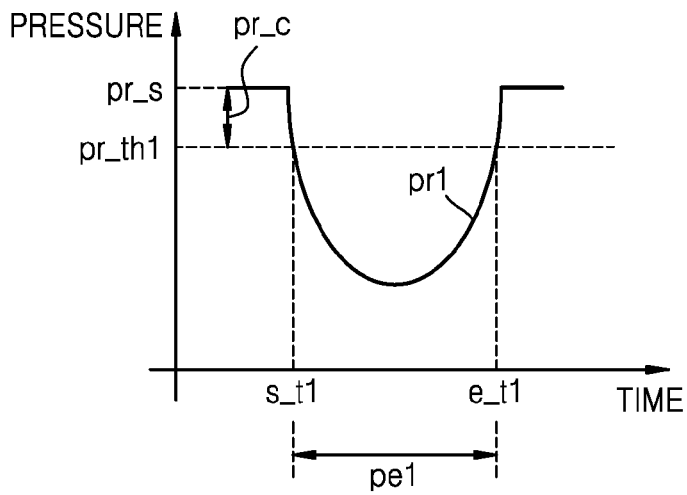
[Fig. 7]
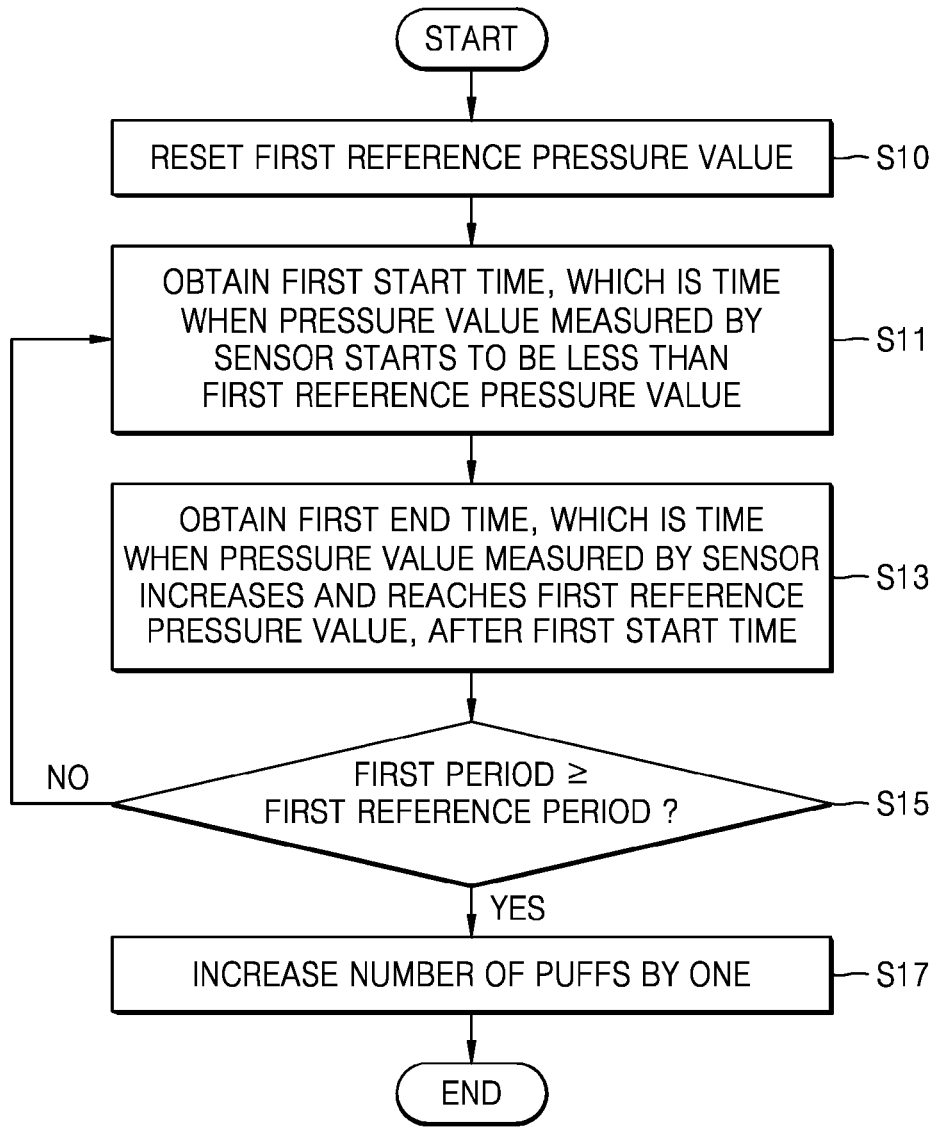

[Fig. 8]
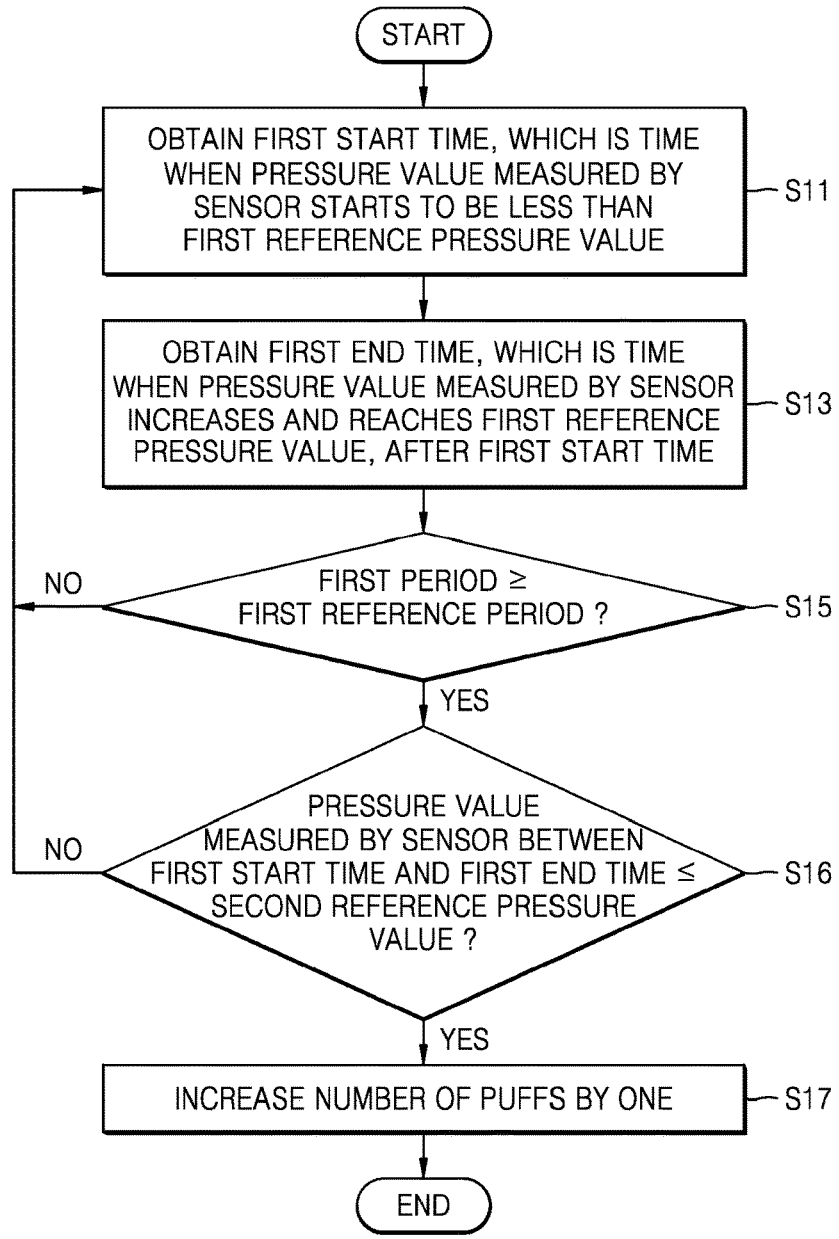
[Fig. 9]
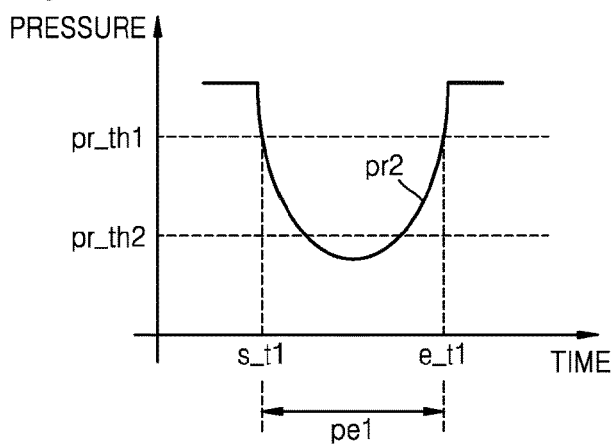

[Fig. 10]
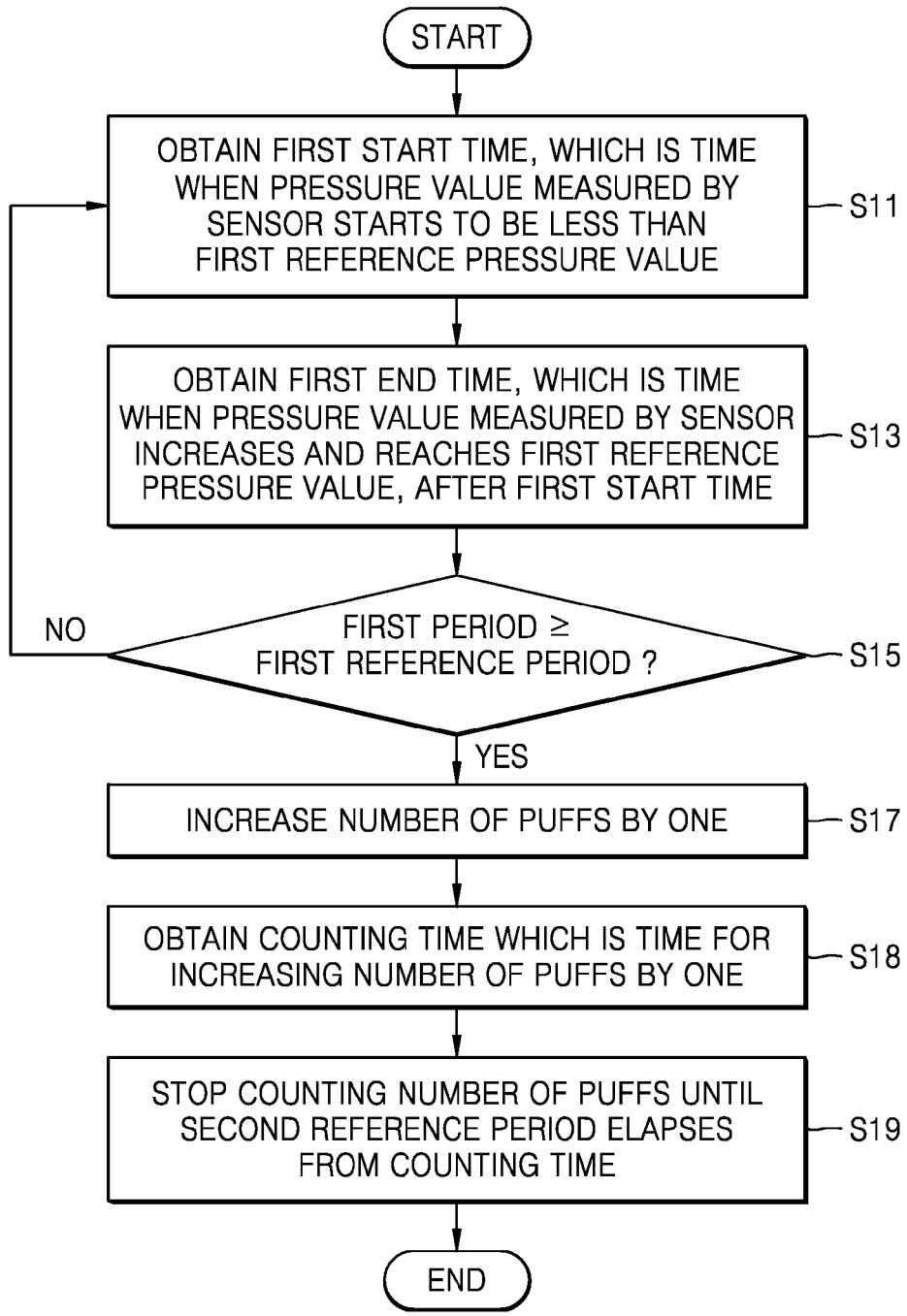

[Fig. 11]
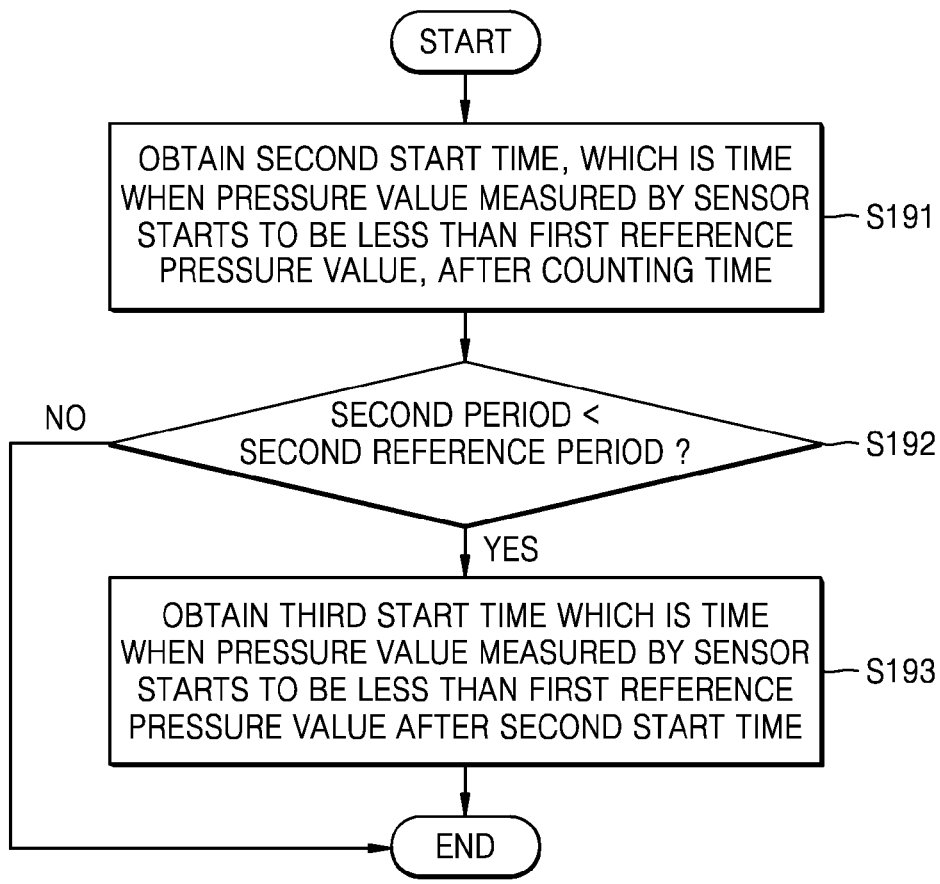
[Fig. 12]
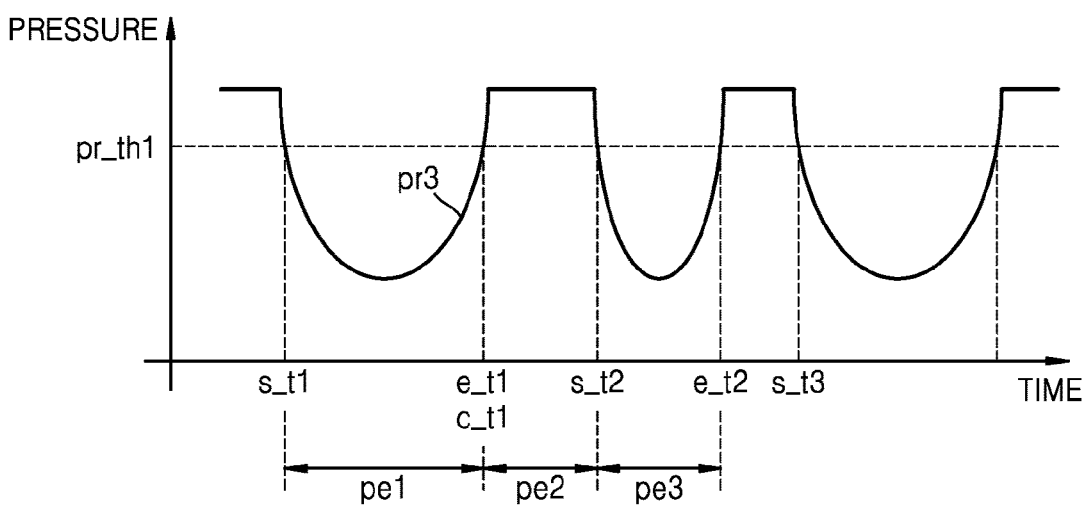

[Fig. 13]
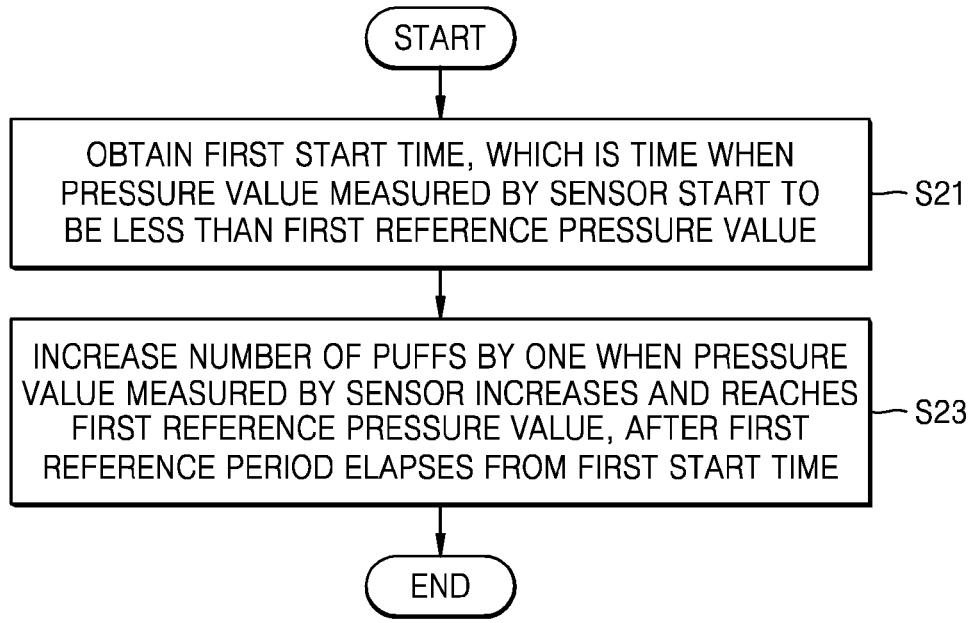
[Fig. 14]
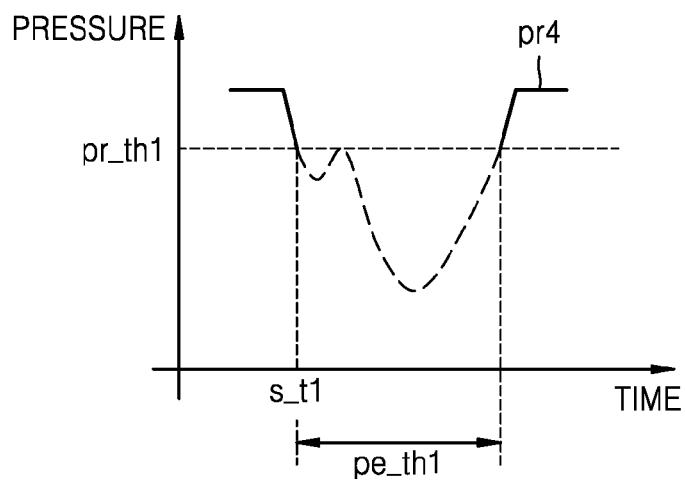

[Fig. 15]
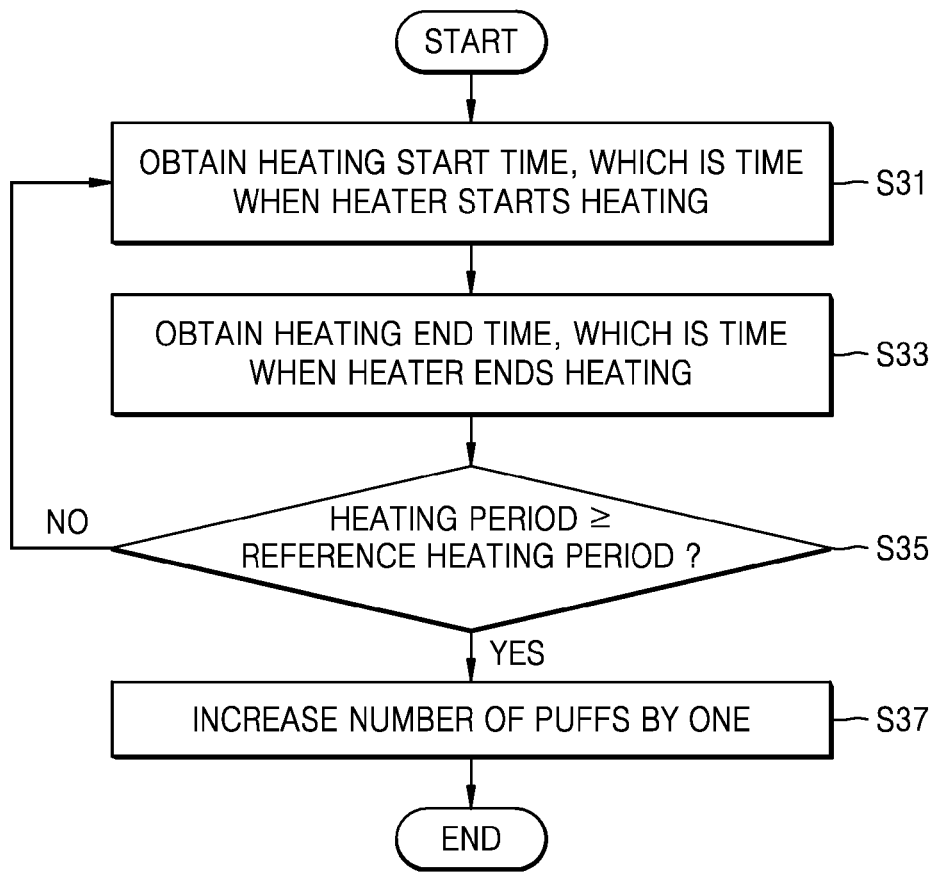

METHOD FOR COUNTING THE NUMBER OF PUFFS AND AEROSOL GENERATING DEVICE USING THE SAME

CROSS REFERENCE TO RELATED APPLICATIONS

This application is a National Stage of International Application No. PCT/KR2020/005017, filed Apr. 14, 2020, claiming priority to Korean Patent Application No. 10-2019-0045646, filed Apr. 18, 2019.

TECHNICAL FIELD

One or more embodiments relate to a method in which an aerosol generating device counts the number of puffs.

BACKGROUND ART

Recently, the demand for alternative methods to overcome the shortcomings of general cigarettes has increased. For example, there is an increasing demand for a method of generating aerosol by heating an aerosol generating material, rather than by combusting cigarettes.

Accordingly, a technique for accurately counting the number of puffs is required.

DISCLOSURE OF INVENTION

Solution to Problem

One or more embodiments provide a method for the aerosol generating device to count the number of puffs. A method of counting the number of puffs using an aerosol generating device according to one or more embodiments may include obtaining a first start time which is a time when a pressure measured by a sensor included in the aerosol generating device decreases below a first reference pressure value; obtaining a first end time which is a time when the pressure measured by the sensor reaches the first reference pressure value after the first start time; determining whether a first period, which is a period between the first end time and the first start time, is longer than or equal to a first reference period; and increase the number of puffs by one based on the first period being longer than or equal to the first reference period.

Advantageous Effects of Invention

According to one or more embodiments, noise as opposed to a user's normal one-time inhalation action, such as an abnormal inhalation action, an external pressure change, and temporary shaking of air flow inside an aerosol generating device, can be prevented from being counted as puff, thereby improving the accuracy of counting the number of puffs.

The effects of the invention are not limited by the descriptions exemplified above, and more various effects are included in the present specification.

BRIEF DESCRIPTION OF DRAWINGS

FIG. 1 is an exploded perspective view schematically illustrating a coupling relationship between a replaceable cartridge containing an aerosol generating material and an aerosol generating device including the same, according to an embodiment.

FIG. 2 is a perspective view of an exemplary operating state of the aerosol generating device according to the embodiment illustrated in FIG. 1.

FIG. 3 is a perspective view of another exemplary operating state of the aerosol generating device according to the embodiment illustrated in FIG. 1.

FIG. 4 is a block diagram illustrating hardware components of the aerosol generating device according to an embodiment.

FIG. 5 is a flowchart illustrating an example of a method in which the aerosol generating device counts the number of puffs.

FIG. 6 is a graph showing an example of a pressure value measured by a sensor of the aerosol generating device.

FIG. 7 is a flowchart illustrating an example of a method in which the aerosol generating device counts the number of puffs.

FIG. 8 is a flowchart illustrating an example of a method in which the aerosol generating device counts the number of puffs.

FIG. 9 is a graph showing an example of a pressure value measured by a sensor of the aerosol generating device.

FIG. 10 is a flowchart illustrating an example of a method in which the aerosol generating device counts the number of puffs.

FIG. 11 is a flowchart illustrating an example of a method for performing step S19.

FIG. 12 is a graph showing an example of a pressure value measured by a sensor of the aerosol generating device.

FIG. 13 is a flowchart illustrating an example of a method in which the aerosol generating device counts the number of puffs.

FIG. 14 is a graph showing an example of a pressure value measured by a sensor of the aerosol generating device.

FIG. 15 is a flowchart illustrating an example of a method in which the aerosol generating device counts the number of puffs.

BEST MODE FOR CARRYING OUT THE INVENTION

A method of counting the number of puffs using an aerosol generating device according to one or more embodiments may include obtaining a first start time which is a time when a pressure measured by a sensor included in the aerosol generating device decreases below a first reference pressure value; obtaining a first end time which is a time when the pressure measured by the sensor reaches the first reference pressure value after the first stall time; determining whether a first period, which is a period between the first end time and the first start time, is longer than or equal to a first reference period; and increase the number of puffs by one based on the first period being longer than or equal to the first reference period.

A method of counting the number of puffs using an aerosol generating device according to one or more embodiments may include obtaining a heating start time which is a time when a heater included in the aerosol generating device starts heating; obtaining a heating end time which is a time when the heater ends heating after the heating start time; comparing a heating period, which is a period between the heating end time and the heating start time, with a reference heating period; and increasing the number of puffs by one, based on the heating period being longer than or equal to the reference heating period.

A method of counting the number of puffs using an aerosol generating device according to one or more embodiments may include obtaining a first start time which is a time when a pressure measured by a sensor included in the aerosol generating device decreases below a first reference pressure value; and increasing the number of puffs by one, based on the pressure measured by the sensor increasing and reaching the first reference pressure value after a first reference period elapses from the first start time.

An aerosol generating device of generating an aerosol by heating a liquid composition according to one or more embodiments may include a heater configured to heat the liquid composition; a sensor configured to measure a pressure in the aerosol generating device; and a controller configured to: obtain a first start time which is a time when the pressure measured by the sensor decreases below a first reference pressure value, obtain a first end time which is a time when the pressure measured by the sensor reaches the first reference pressure value, determine whether a first period, which is a period between the first end time and the first start time, is longer than or equal to a first reference period, and increase the number of puffs by one, based on the first period being longer than the first reference period.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is an exploded perspective view schematically illustrating a coupling relationship between a replaceable cartridge containing an aerosol generating material and an aerosol generating device including the same, according to an embodiment.

An aerosol generating device 5 according to the embodiment illustrated in FIG. 1 includes the cartridge 20 containing the aerosol generating material and a main body 10 supporting the cartridge 20.

The cartridge 20 containing the aerosol generating material may be coupled to the main body 10. A portion of the cartridge 20 may be inserted into an accommodation space 19 of the main body 10 so that the cartridge 20 may be mounted on the main body 10.

The cartridge 20 may contain an aerosol generating material that is, for example, a liquid state, a solid state, a gaseous state, or a gel state. The aerosol generating material may include a liquid composition. For example, the liquid composition may be a liquid including a tobacco-containing material having a volatile tobacco flavor component, or a liquid including a non-tobacco material.

For example, the liquid composition may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include in-gradients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 5, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid, and malic acid, or may be a mixture of two or more acids selected from the above-described group, but is not limited thereto.

The cartridge 20 may be operated by an electrical signal or a wireless signal transmitted from the main body 10 to perform a function of generating aerosol by converting the phase of the aerosol generating material inside the cartridge 20 to a gaseous phase. The aerosol may refer to a gas in which vaporized particles generated from an aerosol generating material are mixed with air.

For example, in response to receiving the electrical signal from the main body 10, the cartridge 20 may convert the phase of the aerosol generating material by heating the aerosol generating material, using, for example, an ultrasonic vibration method or an induction heating method. In an embodiment, the cartridge 20 may include its own power source and generate aerosol based on an electric control signal or a wireless signal received from the main body 10.

The cartridge 20 may include a liquid storage 21 accommodating the aerosol generating material therein, and an atomizer performing a function of converting the aerosol generating material of the liquid storage 21 to aerosol.

When the liquid storage 21 "accommodates the aerosol generating material" therein, it means that the liquid storage 21 functions as a container simply holding an aerosol generating material. The liquid storage 21 may include an element impregnated with (i.e., containing) an aerosol generating material, such as a sponge, cotton, fabric, or porous ceramic structure.

The atomizer may include, for example, a liquid delivery element (e.g., a wick) for absorbing the aerosol generating material and maintaining the same in an optimal state for conversion to aerosol, and a heater heating the liquid delivery element to generate aerosol.

The liquid delivery element may include at least one of, for example, a cotton fiber, a ceramic fiber, a glass fiber, and porous ceramic.

The heater may include a metallic material such as copper, nickel, tungsten, or the like to heat the aerosol generating material delivered to the liquid delivery element by generating heat using electrical resistance. The heater may be implemented by, for example, a metal wire, a metal plate, a ceramic heating element, or the like. Also, the heater may be implemented by a conductive filament using a material such as a nichrome wire, and may be wound around or arranged adjacent to the liquid delivery element.

In addition, the atomizer may be implemented by a heating element in the form of a mesh or plate, which absorbs the aerosol generating material and maintains the same in an optimal state for conversion to aerosol, and generates aerosol by heating the aerosol generating material. In this case, a separate liquid delivery element may not be required.

At least a portion of the liquid storage 21 of the cartridge 20 may include a transparent portion so that the aerosol generating material accommodated in the cartridge 20 may be visually identified from the outside. The liquid storage 21 may include a protruding window 21a protruding from the liquid storage 21, so that the liquid storage 21 may be inserted into a groove 11 of the main body 10 when coupled to the main body 10. A mouthpiece 22 and/or the liquid storage 21 may be entirely formed of transparent plastic or glass. Alternatively, only the protruding window 21a may be formed of a transparent material.

The main body 10 includes a connection terminal 10t arranged inside the accommodation space 19. When the liquid storage 21 of the cartridge 20 is inserted into the accommodation space 19 of the main body 10, the main body 10 may provide power to the cartridge 20 or supply a signal related to an operation of the cartridge 20 to the cartridge 20, through the connection terminal 10t.

The mouthpiece 22 is coupled to one end of the liquid storage 21 of the cartridge 20. The mouthpiece 22 is a portion of the aerosol generating device 5, which is to be inserted into a user's mouth. The mouthpiece 22 includes a discharge hole 22a for discharging aerosol generated from the aerosol generating material inside the liquid storage 21 to the outside.

The slider 7 is coupled to the main body 10 to move with respect to the main body 10. The slider 7 covers or exposes at least a portion of the mouthpiece 22 of the cartridge 20 coupled to the main body 10 by moving with respect to the main body 10. The slider 7 includes an elongated hole 7a exposing at least a portion of the protruding window 2 la of the cartridge 20 to the outside.

As shown FIG. 1, the slider 7 may have a shape of a hollow container with both ends opened, but the structure of the slider 7 is not limited thereto. For example, the slider 7 may have a bent plate structure having a clip-shaped cross-section, which is movable with respect to the main body 10 while being coupled to an edge of the main body 10. In another example, the slider 7 may have a curved semi-cylindrical shape with a curved arc-shaped cross section.

The slider 7 may include a magnetic body for maintaining the position of the slider 7 with respect to the main body 10 and the cartridge 20. The magnetic body may include a permanent magnet or a material such as iron, nickel, cobalt, or an alloy thereof.

The magnetic body may include two first magnetic bodies 8a facing each other, and two second magnetic bodies 8b facing each other. The first magnetic bodies 8a arc arranged to be spaced apart from the second magnetic bodies 8b in a longitudinal direction of the main body 10 (i.e., the direction in which the main body 10 extends), which is a moving direction of the slider 7.

The main body 10 includes a fixed magnetic body 9 arranged on a path along which the first magnetic bodies 8a and the second magnetic bodies 8b of the slider 7 move as the slider 7 moves with respect to the main body 10. Two fixed magnetic bodies 9 of the main body 10 may be mounted to face each other with the accommodation space 19 therebetween.

The slider 7 may be stably maintained in positions where an end of the mouthpiece 22 is covered or exposed, by magnetic force acting between the fixed magnetic body 9 and the first magnetic body 8a or between the fixed magnetic body 9 and the second magnetic body 8b.

The main body 10 includes a position change detecting sensor 3 arranged on the path along which the first magnetic body 8a and the second magnetic body 8b of the slider 7 move as the slider 7 moves with respect to the main body 10. The position change detecting sensor 3 may include, for example, a Hall integrated circuit (IC) that uses the Hall effect to detect a change in a magnetic field, and may generate a signal based on the detected change.

In the aerosol generating device 5 according to the above-described embodiments, the main body 10, the cartridge 20, and the slider 7 have approximately rectangular cross-sectional shapes when viewed in the longitudinal direction, but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly, and may be curved in a streamlined shape or bent at a preset angle to be easily held by the user.

FIG. 2 is a perspective view of an exemplary operating state of the aerosol generating device according to the embodiment illustrated in FIG. 1.

In FIG. 2, the slider 7 is moved to a position where the end of the mouthpiece 22 of the cartridge coupled to the main body 10 is covered. In this state, the mouthpiece 22 may be safely protected from external impurities and kept clean.

The user may check the remaining amount of aerosol generating material contained in the cartridge by visually checking the protruding window 21a of the cartridge through the elongated hole 7a of the slider 7. The user may move the slider 7 in the longitudinal direction of the main body 10 to use the aerosol generating device 5.

FIG. 3 is a perspective view of another exemplary operating state of the aerosol generating device according to the embodiment illustrated in FIG. 1.

In FIG. 3, the operating state is shown in which the slider 7 is moved to a position where the end of the mouthpiece 22 of the cartridge coupled to the main body 10 is exposed to the outside. In this state, the user may insert the mouthpiece 22 into his or her mouth and inhale aerosol discharged through the discharge hole 22a of the mouthpiece 22.

As shown in FIG. 3, the protruding window 21a of the cartridge is still exposed to the outside through the elongated hole 7a of the slider 7 when the slider 7 is moved to the position where the end of the mouthpiece 22 is exposed to the outside. Thus, the user may be able to visually check the remaining amount of aerosol generating material contained in the cartridge, regardless of the position of the slider 7.

FIG. 4 is a block diagram illustrating components of the aerosol generating device according to an embodiment.

Referring to FIG. 4, the aerosol generating device 5 may include a battery 31, a heater 32, a sensor 33, a user interface 34, a memory 35, and a controller 36. However, the internal structure of the aerosol generating device 5 is not limited to the structures illustrated in FIG. 4. Also, it will be understood by one of ordinary skill in the art that some of the hardware components shown in FIG. 4 may be omitted or new components may be added according to the design of the aerosol generating device 5.

In an embodiment where the aerosol generating device 5 includes a main body without a cartridge, the components shown in FIG. 4 may be located in the main body. In another embodiment where the aerosol generating device 5 includes a main body and a cartridge, the components shown in FIG. 4 may be located in the main body and/or the cartridge.

The battery 31 supplies electric power to be used for the aerosol generating device 5 to operate. For example, the battery 31 may supply power such that the heater 32 may be heated. In addition, the battery 31 may supply power required for operation of other components of the aerosol generating device 5, such as the sensor 33, the user interface 34, the memory 35, and the controller 36. The battery 31 may be a rechargeable battery or a disposable battery. For example, the battery 31 may be a lithium polymer (LiPoly) battery, but is not limited thereto.

The heater 32 receives power from the battery 31 under the control of the controller 36. The heater 32 may receive power from the battery 31 and heat a cigarette inserted into the aerosol generating device 5, or heat the cartridge mounted on the aerosol generating device 5.

The heater 32 may be located in the main body of the aerosol generating device 5. Alternatively, the heater 32 may be located in the cartridge. When the heater 32 is located in the cartridge, the heater 32 may receive power from the battery 31 located in the main body and/or the cartridge.

The heater 32 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 32 may be implemented by a metal wire, a metal plate on which an electrically conductive track is arranged, or a ceramic heating element, but is not limited thereto.

In an embodiment, the heater 32 may be included in the cartridge. The cartridge may include the heater 32, the liquid delivery element, and the liquid storage. The aerosol generating material accommodated in the liquid storage may be absorbed by the liquid delivery element, and the heater 32 may heat the aerosol generating material absorbed by the liquid delivery element, thereby generating aerosol. For example, the heater 32 may include a material such as nickel or chromium and may be wound around or arranged adjacent to the liquid delivery element.

Meanwhile, the heater 32 may include an induction heater. The heater 32 may include an electrically conductive coil for heating a cigarette or the cartridge by an induction heating method, and the cigarette or the cartridge may include a susceptor which may be heated by the induction heater.

The aerosol generating device 5 may include at least one sensor 33. A result sensed by the at least one sensor 33 is transmitted to the controller 36, and the controller 36 may control the aerosol generating device 5 by controlling the operation of the heater, restricting smoking, determining whether a cigarette (or a cartridge) is inserted, displaying a notification, etc.

For example, the sensor 33 may include a puff detecting sensor. The puff detecting sensor may detect a user's puff based on a temperature change, a flow change, a voltage change, and/or a pressure change.

For example, the puff detecting sensor may include a pressure sensor. The pressure sensor may measure an internal pressure of the aerosol generating device 5. For example, the aerosol generating device 5 may include the airflow path therein, and the pressure sensor may be disposed near the airflow path to measure the pressure of the airflow path.

For example, the puff detecting sensor may include a touch detecting sensor such as a resistance sensor or a capacitance sensor. The touch detecting sensor may detect that the user's lips touch the aerosol generating device 5.

In addition, the at least one sensor 33 may include a temperature sensor. The temperature sensor may detect a temperature of the heater 32 (or an aerosol generating material). The aerosol generating device 5 may include a separate temperature sensor for sensing a temperature of the heater 32, or the heater 32 itself may serve as a temperature sensor without a separate temperature sensor. Alternatively, an additional temperature sensor may be further included in the aerosol generating device 5 even when the heater 32 serves as a temperature sensor.

The sensor 33 may include a position change detecting sensor. The position change detecting sensor may detect a change in a position of the slider which is coupled to the main body and slides along the main body.

The user interface 34 may provide the user with information about the state of the aerosol generating device 5. For example, the user interface 34 may include various interfacing devices, such as a display or a light emitter for outputting visual information, a motor for outputting haptic information, a speaker for outputting sound information, input/output (I/O) interfacing devices (for example, a button or a touch screen) for receiving information input from the user or outputting information to the user, terminals for performing data communication or receiving charging power, and/or communication interfacing modules for performing wireless communication (for example, Wi-Fi, Wi-Fi direct, Bluetooth, near-field communication (NFC), etc.) with external devices.

The memory 35 may store various data processed or to be processed by the controller 36. The memory 35 may include various types of memories, such as dynamic random access memory (DRAM), static random access memory (SRAM), read-only memory (ROM), electrically erasable programmable read-only memory (EEPROM), etc.

For example, the memory 35 may store an operation time of the aerosol generating device 5, the maximum number of puffs, the current number of puffs, at least one temperature profile, data on a user's smoking pattern, etc.

The controller 36 may control overall operations of the aerosol generating device 5. The controller 36 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The controller 36 analyzes a result of the sensing by at least one sensor 33, and controls processes that are to be performed subsequently.

The controller 36 may control power supplied to the heater 32 so that the operation of the heater 32 is started or terminated, based on the result of the sensing by the sensor 33. In addition, based on the result of the sensing by the sensor 33, the controller 36 may control the amount of power supplied to the heater 32 and the time at which the power is supplied, so that the heater 32 is heated to a predetermined temperature or maintained at an appropriate temperature.

In an embodiment, the controller 36 may set a mode of the heater 5 to a pre-heating mode to start the operation of the heater 32 after receiving a user input to the aerosol generating device 5. In addition, the controller 36 may switch the mode of the heater 32 from the pre-heating mode to an operation mode after detecting a user's puff by using the puff detecting sensor. In addition, the controller 36 may stop supplying power to the heater 32 when the number of puffs reaches a preset number after counting the number of puffs by using the puff detecting sensor.

The controller 36 may control the user interface 34 based on the result of the sensing by the at least one sensor 33. For example, when the number of puffs counted by the puff detecting sensor reaches a preset number, the controller 36 may notify the user by using the user interface 34 (e.g., a light emitter, a motor, a speaker, etc.) that the aerosol generating device 5 will soon be terminated.

Although not illustrated in FIG. 4, the aerosol generating device 5 may be combined with a separate cradle to form an aerosol generating system. For example, the cradle may be used to charge the battery 31 of the aerosol generating device 5. For example, the aerosol generating device 5 may be supplied with power from a battery of the cradle to charge the battery 31 of the aerosol generating device 5 while being accommodated in an accommodation space of the cradle.

FIG. 5 is a flowchart illustrating an example of a method in which the aerosol generating device counts the number of puffs. FIG. 6 is a graph showing an example of a pressure value measured by the sensor of the aerosol generating device.

An example of a method in which the aerosol generating device counts the number of puffs will be described with reference to FIGS. 5 and 6, based on the aerosol generating device 5 shown in FIG. 4.

In step Si1, the controller 36 may obtain a first start time s_t1, which is a time when the pressure pr1 measured by the sensor 33 becomes smaller than a first reference pressure value pr_th 1.

The first reference pressure value pr_th1 may be a value smaller than a pressure value pr_s which is measured by the sensor 33 at an arbitrary time, after the power of the aerosol generating device 5 is turned on and before a puff occurs.

For example, the first reference pressure value pr_th1 may be smaller than the pressure value pr_s by a predetermined value pr_c.

For example, the predetermined value pr_c may be a value determined based on how much the pressure decreases due to a puff. For example, if the pressure measured by the sensor decreases by 40 due to the puff, the predetermined value pr_c may be determined as 30% of 40, which is 12. As a result, the first reference pressure value pr_th1 may be set to 88, which is 12 less than 100.

In another example, the first reference pressure value pr_th1 may be a value corresponding to a predetermined ratio with respect to the pressure value pr_s measured by the sensor 33 at an arbitrary time.

For example, if the pressure value pr_s measured by the sensor 33 at the arbitrary time is 100 and the predetermined ratio is 80%, the first reference pressure value pr_th1 may be set to 80, which is 80% of 100.

Here, the arbitrary time at which the pressure value pr_s is measured may be when the power of the aerosol generating device 5 is turned on or when the preheating of the heater 32 of the aerosol generating device 5 is completed.

If the first reference pressure value pr_th 1 is set equal to the pressure value pr_s measured by the sensor 33 at the arbitrary time, a fine pressure change of the aerosol generating device 5 may be recognized as a puff. The puff may be recognized more robustly by setting the first reference pressure value pr_th I to a value smaller than the pressure value pr_s measured by the sensor 33 at an arbitrary time.

When the user starts inhaling, the internal pressure of the aerosol generating device 5 decreases, so the pressure value measured by the sensor 33 may decrease. Therefore, the first stait time s_t 1 obtained in step Si 1 may correspond to a time when the user starts to inhale.

In step SI 1, the controller 36 may obtain a first start time s_t1, which is a time when the controller controls the heater 32 to start heating to generate aerosol. That is, the first start time s_t1 may correspond to a time when the heater 32 starts heating.

In step S13, the controller 36 may obtain a first end time e_t 1, which is a time when the pressure pr1 measured by the sensor 33 reaches the first reference pressure value pr_th 1, after the first start time s_t 1. That is, the controller 36 may obtain the first start time s_t1 and the first end time e_t1 based on the first reference pressure value pr_th1.

When the user stops inhaling, the internal pressure of the aerosol generating device 5 is restored, so the pressure value measured by the sensor 33 may return to the pressure level before the inhaling. Therefore, the first end time e_t1 obtained in step S13 may correspond to a time when the user ends the inhalation.

In step S13, the controller 36 may control the heater 32 to stop heating in order to stop generating the aerosol. That is, the first end time c_t1 may correspond to a time when the heater 32 ends heating.

In step SI5, the controller 36 may determine whether a first period pe1 between the first end time e_t1 and the first start time s_t1 is greater than or equal to a first reference period pe_th1. The first period pe1 may correspond to a period during which the user inhales.

The first reference period pc_th 1 may be a preset value. For example, the first reference period (pe_th1) may be an average time required for the user to inhale the aerosol once.

In step S17, the controller 36 may add one to the number of puffs once if the first period pe1 is greater than or equal to the first reference period pc_th1.

The internal pressure of the aerosol generating device 5 may be changed by noise instead of the user's normal one-time inhalation action, such as abnormal inhalation action, external pressure change, and the temporary shaking of air flow inside the aerosol generating device. However, if the number of puffs is counted according to the method illustrated in FIG. 5, the number of puffs may be prevented from being counted by such noise.

FIG. 7 is a flowchart illustrating an example of a method in which the aerosol generating device counts the number of puffs.

The method illustrated in FIG. 7 may differ from the method illustrated in FIG. 5 in that FIG. 7 further includes step S10. In order to avoid repetition of the descriptions, only the step S10 is described based on the aerosol generating device 5 shown in FIG. 4.

In step S10, the controller 36 may reset the first reference pressure value. For example, the controller 36 may reset the first reference pressure value to a value smaller than the pressure value measured by the sensor 33 when the aerosol generating device 5 is turned on. For example, the reset first reference pressure value may be maintained until the aerosol generating device 5 is turned off.

Alternatively, the controller 36 may reset the first reference pressure value to a value smaller than the pressure value measured by the sensor 33 at an arbitrary time after the aerosol generating device 5 is turned on. For example, after the aerosol generating device 5 is turned on, the controller 36 may reset the first reference pressure value based on the pressure value measured by the sensor 33 when the preheating time of the heater 32 ends. In another example, the controller 36 may reset the first reference pressure value based on the pressure value measured by the sensor 33 at another time point between when the aerosol generating device 5 is turned on and before the user starts to inhale.

As described above, the first reference pressure value may be set based on the pressure in the space where the user smokes whenever the aerosol generating device 5 is turned on. Thereby, the number of puffs may be counted more accurately. Furthermore, by resetting the first reference pressure value based on the pressure value measured by the sensor 33 after the preheating time of the heater 32 ends, the number of puffs may be more accurately counted. That is, the inaccuracy of count of the number of puffs due to the change in the internal pressure of the aerosol generating device caused by heating of the heater 32 may be eliminated.

FIG. 8 is a flowchart illustrating an example of a method in which the aerosol generating device counts the number of puffs. FIG. 9 is a graph showing an example of a pressure value measured by a sensor of the aerosol generating device.

The method illustrated in FIG. 8 differs from the method illustrated in FIG. 5 in that FIG. 8 further includes step S16. In order to avoid repetition of the descriptions, only steps S16 and S17 are described with reference to FIGS. 8 and 9 based on the aerosol generating device 5 illustrated in FIG. 4.

In step S16, the controller 36 may determine whether the pressure pr2 measured by the sensor 33 between the first start time s_t1 and the first end time e_t 1 decreases below a second reference pressure value pr_th2.

The second reference pressure value pr_th2 is a value smaller than the first reference pressure value pr_th1 and may be a preset value. The second reference pressure value pr_th2 may be used as a threshold pressure value for determining whether the internal pressure of the aerosol generating device 5 has decreased due to the user's inhalation. For example, the second reference pressure value pr_th2 may be set to a smaller value than the first reference pressure value pr_th 1. For example, the second reference pressure value pr_th2 may also be reset as the first reference pressure value pr_th1 is reset.

In step SI 7, the number of puffs can be increased by one when the conditions in steps S15 and S16 are satisfied.

The period between the first start time s_t1 and the first end time e_t 1 corresponds to a period during which the user is inhaling. The first start time s_t1 and the first end time e_t1 arc measured when the internal pressure of the aerosol generating device 5 is changed by the user's normal inhalation action. However, the first start time s_t 1 and the first end time e_t1 may be measured incorrectly by a change in the internal pressure of the aerosol generating device 5 caused due to noise, such as user's abnormal inhalation or a change in the external environment. The controller 36 may compare the pressure pr2 measured by the sensor 33 and the second reference pressure value pr_th2 to detect the user's normal inhalation, and thus count the number of puffs more accurately. FIG. 10 is a flowchart illustrating an example of a method in which the aerosol generating device counts the number of puffs. FIG. 11 is a flowchart illustrating an example of a method for performing step SI9. FIG. 12 is a graph showing an example of a pressure value measured by a sensor of the aerosol generating device.

The method shown in FIG. 10 differs from the method shown in FIG. 5 in that FIG. 10 further includes steps S18 and S19. In order to avoid repetition of the descriptions, only steps S18 and S19 are described with reference to FIGS. 10 to 12 based on the aerosol generating device 5 shown in FIG. 4.

In step S18, the controller 36 may obtain a counting time c_t 1, which is the time when the number of puffs is increased by one in step S17. The time taken for the control unit 36 to perform steps S13 to S17 may be a very short, and the counting time c_t 1 may be considered as equal to the first end time c_t 1.

In step S19, the controller 36 may stop counting the number of puffs until the second reference period pc_th2 elapses from the counting time c_t 1.

Step S19 may be described in more detail with reference to FIG. 11.

In step S191, the controller 36 may obtain a second start time s_t2, which is a time when a pressure pr3 measured by the sensor 33 starts to be smaller than the first reference pressure value pr_th1, after the counting time c_t1. The second start time s_t2 may correspond to a time when the user starts inhaling again after the previous inhalation performed from the first start time s_t1 to the first end time e_t1.

In step S192, the controller 36 may determine whether the second period pe2, which is the period between the second start time s_t2 and the counting time c_t1, is shorter than the second reference period pe_th2.

The second reference period (pc_th2) is a reference value used to distinguish one user's inhalation action from the next inhalation action. For example, the second reference period pe_th2 may be a period longer than the first reference period pe_th 1.

In step S193, if the second period pe2 is shorter than the second reference period pc_th2, the controller 36 may obtain a third start time s_t3 which is a time when the pressure value measured by the sensor starts to be smaller than the first reference pressure value pr_th1 after the second start time s_t2.

Conversely, if the second period pc2 is longer than or equal to the second reference period pc_th2, the controller 36 may obtain a second end time c_t2, which is a time when the pressure pr3 measured by the sensor 33 increases and then reaches the first reference pressure value pr_th 1 after the second start time s_t2. Also, the controller 36 may determine whether a third period pe3, which is the period between the second end time e_t2 and the second start time s_t2, is longer than or equal to the first reference period pc_th1. If the third period pc3 is greater than or equal to the first reference period pe_th1, the control unit 36 may recognize a puff and increase the number of puffs by one.

According to the embodiments illustrated in FIGS. 10 and 11, the number of puffs may be prevented from counted incorrectly and abnormally quickly.

FIG. 13 is a flowchart illustrating an example of a method in which the aerosol generating device counts the number of puffs. FIG. 14 is a graph showing an example of a pressure value measured by a sensor of the aerosol generating device.

An example of a method in which the aerosol generating device counts the number of puffs is described with reference to FIGS. 13 and 14, based on the aerosol generating device 5 shown in FIG. 4, In step S21, the controller 36 may obtain the first start time s_t1, which is a time when a pressure pr4 measured by the sensor 33 stalls to be smaller than the first reference pressure value pr_th1.

In step S23, the controller 36, after the first reference period pe_th 1 elapses from the first start time s_t1, may count the number of puffs once when the pressure pr4 measured by the sensor 33 increases and then reaches the first reference pressure value pr_th 1.

When the number of puffs is counted according to the method illustrated in FIG. 13, the number of puffs may be counted without being affected by the pressure value measured by the sensor 33, until the first reference period pc_th1 elapses from the first start time s_t 1. Accordingly, until the first reference period pe_th 1 elapses from the first start time s_t1, even if the pressure value measured by the sensor 33 momentarily reaches the first reference pressure value pr_th 1 due to noise or the like, the controller 36 may count the number of puffs without being affected by such noise. In addition, the operation of the sensor 33 may be stopped until the first reference period pc_th 1 elapses from the first start time s_t1, and thus power consumption may be reduced.

FIG. 15 is a flowchart illustrating an example of a method in which the aerosol generating device counts the number of puffs.

An example of a method in which the aerosol generating device counts the number of puffs is described with reference to FIG. 15, based on the aerosol generating device 5 shown in FIG. 4.

In step S31, the controller 36 obtains a heating start time, which is a time when the heater 32 stalls heating.

The controller 36 may control the heater 32 to heat while the user inhales. A heating start time may correspond to a time when the user starts inhaling. In addition, the heating start time may correspond to a time when the battery 31 starts supplying power to the heater 32.

The controller 36 may use the output signal of the sensor 33 to determine whether the user starts inhaling.

For example, when the sensor 33 is a pressure sensor, the controller 36 may determine that the user has started inhaling when the pressure value measured by the pressure sensor falls below the reference value. In this case, the controller 36 may obtain a time when the pressure value measured by the pressure sensor staffs to be smaller than the reference value as the heating start time.

For example, when the sensor 33 is the touch detecting sensor, the controller 36 determines that the user starts inhaling when the touch sensor detects that the user comes in contact with the aerosol generating device 5 (e.g., biting the mouthpiece by mouth). And then, the controller 36 may obtain a time when the touch detecting sensor senses the user's touch as the heating start time.

In step S33, after the heating start time, the controller 36 may obtain a heating end time, which is a time when the heater 32 ends heating.

The controller 36 may control the heater 32 to end heating when the user finishes the inhalation, so the heating end time may correspond to a time when the user ends the inhalation. In addition, the heating end time may correspond to a time when power supply from the battery 31 to the heater 32 ends.

The controller 36 may use the output signal of the sensor 33 to determine whether the user has finished inhaling.

For example, when the sensor 33 is a pressure sensor, the controller 36 may determine that the user finishes inhaling when the pressure value measured by the pressure sensor is restored to the reference value. And then, the controller 36 may obtain a time when the pressure value measured by the pressure sensor reaches the reference value as the heating end time.

For example, when the sensor 33 is the touch detecting sensor, the controller 36 may determine that the user finishes inhaling when the touch detecting sensor detects that the user terminates the contact with the aerosol generating device 5 (e.g., biting the mouthpiece by mouth). And then, the controller 36 may obtain a time when the touch detecting sensor detects that the user's contact is lost as the heating end time.

Here, the heating start time and the heating end time arc distinguished from the times when the heater is turned on and off repeatedly during the heating period by pulse width modulation (PWM) control. That is, the heating start time may correspond to the time when the PWM control is initiated, and the heating end time may correspond to the time when the PWM control is terminated.

In step S35, the controller 36 may determine whether a heating period, which is the period between the heating end time and the heating start time, is greater than or equal to a reference heating period.

The heating period may correspond to a period during which the user inhales.

The reference heating period may be a preset value. For example, the reference heating period may be the average time it takes for the user to inhale the aerosol once.

In step S37, the controller 36 may recognize a puff and increase the number of puffs by one, when the heating period is longer than or equal to the reference heating period.

When the number of puffs is counted according to the method illustrated in FIG. 15, the number of puffs may be counted based on the period during which the heater 32 is heated. In addition, the number of puffs may be counted by the same algorithm regardless of the type of sensor mounted on the aerosol generating device 5.

At least one of the components, elements, modules or units (collectively "components" in this paragraph) represented by a block in the drawings such as the controller 36 and the user interface 34 in FIG. 4, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related ail techniques for electronics configuration, signal processing and/or control, data processing and the like.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the disclosure should be defined by the appended claims, and all differences within the scope equivalent to those described in the claims will be construed as being included in the scope of protection defined by the claims.

The invention claimed is:

1. A method of counting a number of puffs in an aerosol generating device, the method comprising:
obtaining a first start time which is a time when a pressure measured by a sensor included in the aerosol generating device decreases below a first reference pressure value, the first reference pressure value being a value smaller than a pressure value which is measured by the sensor at an arbitrary time, after the power of the aerosol generating device is turned on and before a puff occurs;
obtaining a first end time which is a time when the pressure measured by the sensor reaches the first reference pressure value after the first start time;
determining whether a first period, which is a period between the first end time and the first start time, is longer than or equal to a first reference period;
based on determining that the first period is longer than or equal to the first reference period, increasing the number of puffs by one; and
based on determining that the first period is shorter than the first reference period, refraining from increasing the number of puffs by one,
wherein the pressure measured by the sensor between the first start time and the first end time is less than the first reference pressure value.

2. The method of claim 1, further comprising resetting the first reference pressure value.

3. The method of claim 1, further comprising:
obtaining a pressure using the sensor at a predetermined time; and
resetting the first reference pressure value to a value less than the pressure measured at the predetermined time, whenever the aerosol generating device is turned on.

4. The method of claim 3, wherein the predetermined time includes a time when the power to the aerosol generating device is turned on or a time when preheating of a heater of the aerosol generating device is completed.

5. The method of claim 1, further comprising determining whether the pressure measured by the sensor between the first start time and the first end time decreases below a second reference pressure value,
wherein the determining comprises recognizing a puff based on the first period being longer than or equal to the first reference period and the pressure measured by the sensor between the first start time and the first end time decreasing below the second reference pressure value, and
wherein the second reference pressure value is less than the first reference pressure value.

6. The method of claim 1, further comprising:
obtaining a counting time which is a time when the number of puffs is increased by one; and
stopping counting the number of puffs until a second reference period elapses from the counting time.

7. The method of claim 6, wherein the stopping comprises:
obtaining a second start time which is a time when the pressure measured by the sensor decreases below the first reference pressure value after the counting time;
determining whether a second period, which is a period between the second start time and the counting time, is shorter than the second reference period; and
obtaining a third start time which is a time when the pressure measured by the sensor decreases below the first reference pressure value after the second start time, based on the second period decreasing below the second reference period.

8. An aerosol generating device for generating aerosol by heating a liquid composition, the aerosol generating device comprising:
a heater configured to heat the liquid composition;
a sensor configured to measure a pressure in the aerosol generating device; and
a controller configured to:
obtain a first start time which is a time when the pressure measured by the sensor decreases below a first reference pressure value, the first reference pressure value being a value smaller than a pressure value which is measured by the sensor at an arbitrary time, after the power of the aerosol generating device is turned on and before a puff occurs,
obtain a first end time which is a time when the pressure measured by the sensor reaches the first reference pressure value,
determine whether a first period, which is a period between the first end time and the first start time, is longer than or equal to a first reference period,
based on determining that the first period is longer than or equal to the first reference period, increase the number of puffs by one; and
based on determining that the first period is shorter the first reference period, refrain from increasing the number of puffs by one,
wherein the pressure measured by the sensor between the first start time and the first end time is less than the first reference pressure value.

* * * * *